United States Patent
May

[15] 3,704,909
[45] Dec. 5, 1972

[54] TRACTOR
[72] Inventor: Oswald May, Bonn, Germany
[73] Assignee: Klockner-Humboldt-Deutz Aktiengesellschaft, Koln-Deutz, Germany
[22] Filed: March 3, 1970
[21] Appl. No.: 16,172

[52] U.S. Cl. ............................................. 296/102
[51] Int. Cl. .......................................... B62d 25/06
[58] Field of Search ............. 280/150, 150 C, 150 F; 296/28 C, 102; 297/314

[56] References Cited

UNITED STATES PATENTS

| | | | |
|---|---|---|---|
| 2,785,002 | 3/1957 | Shumaker | 296/102 |
| 2,795,458 | 6/1957 | Wieschel | 296/102 |
| 2,783,056 | 2/1967 | Belk | 296/102 X |
| 3,244,251 | 4/1966 | Duncan | 280/150 X |
| 3,473,841 | 10/1969 | Lutz | 296/102 |
| 1,651,292 | 11/1927 | Ramage | 280/150 C UN X |
| 3,036,858 | 5/1962 | Fingernut | 280/150 C X |
| 3,353,852 | 11/1967 | Wood | 296/102 UN X |
| 3,560,019 | 2/1971 | Moore | 280/150 C |
| 3,447,399 | 6/1969 | Hungerford | 180/6.2 X |

Primary Examiner—Benjamin Hersh
Assistant Examiner—Robert R. Song
Attorney—Walter Becker

[57] ABSTRACT

A tractor type vehicle in which frame parts along the sides of the vehicle have upstanding arms at the sides of the driver's position to protect the driver if the vehicle capsizes.

The frame parts are resiliently mounted on the vehicle and fluid operable bolts are provided responsive to fluid pressure to lock the frame parts to the vehicle. The vehicle may carry a loading implement with lift cylinders and a single pressure source is provided for actuating the bolts and the lift cylinders. A valve between the source and the bolts controls the bolts and another valve between the bolts and the lift cylinders provides for actuation of the lift cylinders only when the bolts are actuated.

10 Claims, 11 Drawing Figures

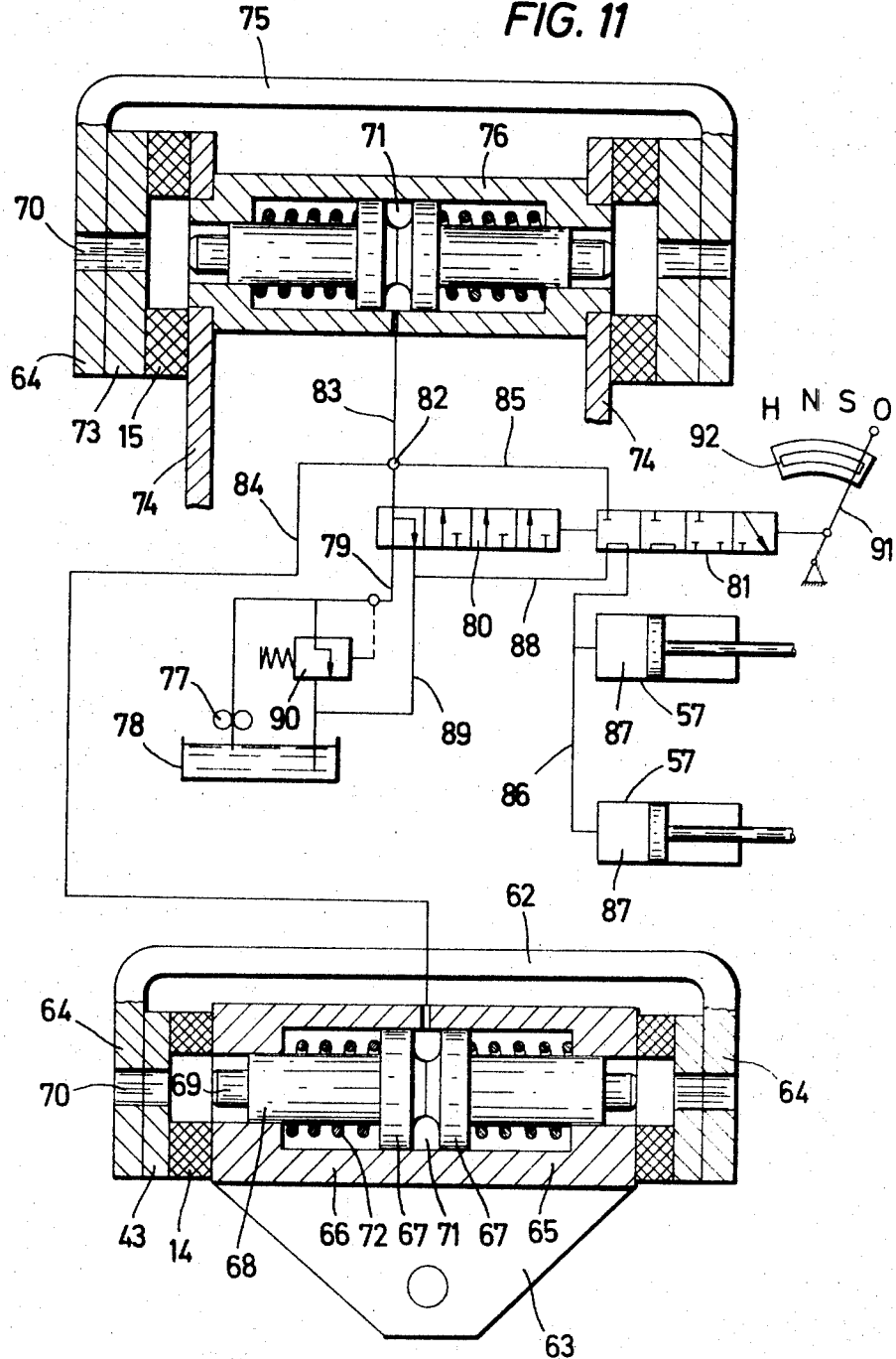

TRACTOR

The present invention relates to a tractor with a driver's seat and protective means against capsizing. A tractor of this type has become known according to which the protective means against capsizing consist of supports which are braced to the driving axle tubes of the driving axle housing and extend upwardly from said tubes, said supports being braced above the fenders for the driving wheels to torsion rods which extend in the driving direction and approximately over the width of the driving wheels. The ends of the torsion rods are by means of the struts of a weather protective roof connected to each other so that when the tractor capsizes, a portion of the impact will elastically be absorbed by the torsion rods. The drawback of such an arrangement, however, consists in that the forces which during a capsizing of the tractor are through the struts introduced into the torsion rods, have to be fully absorbed by the supports which are connected to the driving axle tubes. As a result thereof, the driving axle tubes and the driving axle housing connected thereto will be unduly deformed or destroyed. Moreover, there exists the disadvantage that when the tractor capsizes, bending and distorting forces of such a magnitude may act upon the transmission housing which precedes the driving axle housing and has the driving engine and the front axle support flanged thereto that this transmission housing and/or the driving axle housing as well as the front axle supports will unduly deform or break. This applied in applies when a front loader is built onto the tractor while the fittings of the front loader are exclusively flanged to the transmission housing directly adjacent the driving engine. When the front loader is in lifted position, it will be appreciated that when the tractor capsizes, in view of the long lever arms of the loading members forces of such a magnitude will become active and will act in particular upon the clutch housing forming a supporting structural group with the transmission housing that a break of the lateral walls of the transmission housing and of the clutch housing will occur.

Starting from this state of the art, it is an object of the present invention to improve a tractor of the above mentioned type at relatively low costs in structural respect in such a way that the forces which, when a tractor capsizes, act upon the protective means against capsizing will be so absorbed by the supporting structures that no undue deformation thereof will result.

It is a further object of the present invention to provide a tractor as set forth in the preceding paragraph, in which the driving engine will remain easily accessible while the driver's cabin and the actuating means will be substantially free from vibrations.

It is still another object of this invention to provide a tractor as set forth above in which the steering means, the actuating means for the brake and clutch and the gas control linkage as well as the means for handling the tractor will as fas as possible be incorporated in the protective means against capsizing.

A still further object of this invention consists in the provision of a tractor as outlined in the preceding paragraphs, in which the protective means against capsizing will not interfere with the possibility of connecting loading devices to the tractor.

These and other objects and advantages of the invention will appear more clearly from the following specification in connection with the accompanying drawings, in which.

Figure 1:
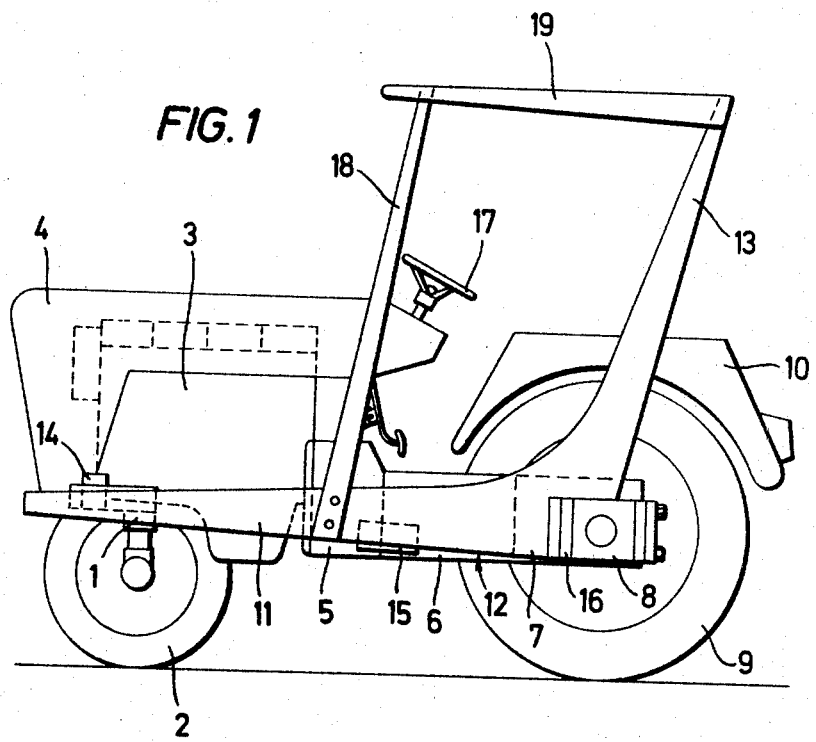
FIG. 1 is a diagrammatic side view of a tractor according to the invention.

FIG. 11 diagrammatically illustrates the hydraulic locking system with the hydraulic circuit pertaining thereto.

The tractor according to the present invention is characterized primarily by frame means which are fastened at both sides of the supporting structural units and which within the region of the driver's seat extend upwardly beyond the normal height of the driver when sitting in the driver's cab. The bridging of the supporting structural groups or units by the frame members extending upwardly to form a protective structure against capsizing brings about the advantage that bending and distorting forces are kept away from the supporting structural elements. Inasmuch as according to the invention bending forces no longer have to be absorbed by the driving axle tubes to the heretofore customary extent, the driving axle tubes can be made considerably lighter whereby the weight of the tractor can be materially reduced.

For purposes of providing protective means against capsizing which will be particularly stiff in transverse direction of the tractor, it is provided according to the invention that the upwardly extending frame members are connected to each other above the driver's seat. For special cases of employment it is expedient in this connection that the connection of the upwardly extending frame members is detachable above the driver's seat.

According to a further development of the invention, in order to create good sight conditions, the frame members may within the region of the driver's seat extend upwardly in the form of a fork. In order to secure a high twist resistance for the upwardly extending legs of the fork-shaped structure, it is provided that the legs of the fork-shaped frame members are connected to each other above the normal height of head of the driver. A transverse stiffening of the upwardly extending frame members is obtained by connecting to each other those legs of the fork-shaped frame members which are located opposite to each other and extend transverse to the driving direction. As connecting means for the legs of the fork-shaped frame members, preferably the detachable struts of a weather protective roof may be used.

Furthermore, in order to permit an unimpeded lateral connection of certain working implements, for instance, parts of multi-purpose machines, those legs of the fork-shaped frame parts which when viewed in driving direction are located laterally ahead of the driver's seat are preferably detachably connected with the frame parts.

According to a further development of the invention, those legs of the fork-shaped frame members which when viewed in driving direction are located laterally ahead of the driver's seat may serve for supporting or holding the windshield.

A transverse stiffening of the protective means against capsizing and a double use for said protective means is obtained in an advantageous manner if, when seen in the driving direction, those legs of the fork-shaped frame parts which are located laterally ahead of the driver's seat are below the steering mechanism bridged by a transverse yoke which serves for journaling the actuating levers and/or pedals. A further transverse stiffening and double use of the frame parts according to the invention will, with a tractor having a steering mechanism comprising a hydraulic control member with steering means which by hydraulic conduits is connected to a hydraulic control motor, be realized when those legs of the fork-shaped frame parts which, when looking in the driving direction, are located laterally ahead of the driver's seat are at the level of the steering mechanism bridges by a transverse yoke and when the transverse yoke serves as holding means for the hydraulic control member, including the steering means.

For purposes of assuring a good lateral accessibility to the driver's seat, the legs of the fork-shaped frame parts have lateral cutouts or openings for allowing the driver to get into the cab. With a tractor in which the driver's seat is arranged substantially between two oppositely located driving or running wheels, it is expedient so to arrange the legs of the fork-shaped parts that two of the legs which in the direction transverse to the driving direction are located opposite to each other extend from the axle center of the driving or running wheels or near to said axle center in upward direction. Furthermore, it is expedient that the longitudinally extending parts of the frame members are bridged within the area of the steering axle. For purposes of further reinforcing the frame members in transverse direction, it is provided according to the invention that the frame parts are below the driver's seat bridged by a driver's platform.

Within the concept of the invention, the longitudinal parts or walls and/or the legs of the fork-shaped frame parts may also serve for mounting the hydraulic transmitters for the hydraulic control devices and/or for mounting control members for hydraulically operated working devices. Furthermore, according to a further development of the invention, it is possible adjacent to the driver's seat to provide the upwardly extending legs of the frame parts, preferably the laterally extending parts, with arm rests. In this connection it is advantageous for relieving the operator, so to design the arm rests that they carry actuating means as, for instance, a control device, hydraulic control means, or the like. In order further to reinforce the upwardly extending frame parts adjacent the driver's seat and to obtain a driver's seat at reasonable costs, it is suggested according to the invention that the upwardly extending legs of the frame parts adjacent the driver's seat are below the driver's seat bridged by a transverse yoke and that the transverse yoke serves as mounting for the driver's seat. For certain requirements of operation, for instance, when working with laterally mounted implements or when driving along a slope, it is advantageous to mount the driver's seat on the transverse yoke in such a way that it is rotatable about a vertical or horizontal axis.

A further double use of the frame parts can be realized when the upwardly extending legs of the fork-shaped frame parts serve for connecting the fenders.

In order to limit the forces which in case of capsizing of the tractor are introduced by the protective means against capsizing into the supporting structural groups, and in order simultaneously to obtain a vibration-free mounting of the frame parts as well as of the parts connected thereto, such as the driver's seat and the steering and control means, it is provided according to the invention that the frame parts are through elastic intermediate members connected with the supporting structural groups of the tractor. With a tractor in which the driving engine and the transmission housing are adjacent to the support for the front axle and in which the driving axle housing is adjacent the transmission housing, it is advantageous to connect the frame parts through elastic intermediate members to the support for the front axle, to the driving engine and also to the transmission housing or the axle tubes therefor.

Inasmuch as large transverse and longitudinal forces can without distortion be introduced by the legs of the frame parts through the lateral side walls and transverse connections into the supporting structural groups, it is provided according to the invention that the legs of the frame parts serve as fittings for the attachment of the lifting beams and/or lifting cylinders of a front or rear loader. In this connection it is advantageous for the operation with loading device during which a resiliency of the frame parts relative to the structural groups supporting the same is not expedient, to provide that the frame parts are with regard to their vertical direction of movement adapted selectively to be locked relative to the supporting structural groups. If during the operation with loading device also a horizontal resiliency of the frame parts relative to the structural groups supporting the same is not desirable, it is suggested that the frame parts in their direction of movement horizontally with regard to the central longitudinal axis of the tractor are adapted to be locked relative to the structural groups supporting the same. Similarly, the frame parts may in order to eliminate spring action in transverse direction, be so designed that they can be locked in a direction of movement transverse to the longitudinal central axis of the tractor with regard to the structural groups supporting the same.

If at the front side of the tractor there is provided a front pushing device and at the rear side of the tractor there is provided a rear pulling device, a simple locking mechanism may be realized by means adapted to lock the frame parts to the front pushing device or the rear pulling device or the holding means therefor. As locking members for the frame parts with regard to the structural groups supporting the same there may be employed bolts or cotter pins, or the like.

A particularly simple and even under most unfavorable conditions quickly effective locking of the frame parts relative to the structural groups supporting the same may, according to a further development of the invention, be realized by designing the locking members as pressure medium operable locks. In this way, with a corresponding design of the locking members, a simultaneous actuation of all locks even in an unfavorable terrain will be possible.

A locking mechanism which as far as its hydraulic part is concerned is simple and inexpensive can be realized by withdrawing the pressure medium for the pressure medium operable locks and the pressure medium for the lifting cylinders of the loading device from a common pressure medium supply. For purposes of a corresponding simultaneous actuation of the hydraulic locking mechanism and the loading device, it is furthermore suggested that the actuating member of the control member for the lifting cylinder pertaining to the loading device is directly or indirectly coupled to the control device of the pressure medium operable lock in such a way that the pressure medium operable locks are supplied with pressure medium prior to the initiation of a loading operation. If the control device for the lifting cylinder of the loading device consists of a manually or foot operable multi-way valve, it is suggested according to the invention that the said valve for the fluid pressure operable actuation of the locks is arranged in series between a pressure medium source and the multi-way valves of the lifting cylinder.

A further simplification of the locking mechanism with regard to structure and control can furthermore be realized by providing the pressure medium operable locks with a piston surface which in the unlocking direction is spring-loaded and is adapted unilaterally to be acted upon by a pressure medium. In this connection it is advantageous to guide the locking members for two oppositely located frame parts in a common cylinder. For purposes of creating a simple control of the locking means and the loading device, it is furthermore suggested that the two multi-way valves are designed as four-way valves in such a way that when said four-way valves occupy a first position, the working chamber of the pressure medium operable locking means and the working chamber of the lifting cylinder communicate with a pressure-less branch while from the second to the fourth position of the four-way valve the working chamber of the locking means communicates with the pressure medium source while the four-way valve for the lifting cylinder has a neutral position between a second lowering and a third lifting position. In the neutral position, the working chamber of the lifting cylinder is blocked. A simplification of the overall construction can furthermore be obtained according to the present invention by combining the control member for the locking means and the control member for the lifting cylinders to a single structural unit.

Referring now to the drawings in detail, the tractor shown in FIG. 1 has a front axle support 1 which forms a supporting structural member and in which transverse to the central longitudinal axis of the tractor there is journalled in a pendulum-like manner a steering axle (not illustrated) with track wheels 2. Braced to the front axle support 1 is a driving engine 3 designed as supporting structural member, which together with the support 1 for the front axle and a fuel tank (not shown) is covered by a hood 4. Flanged to the driving engine 3 as a supporting structural member is a clutch housing 5 which in its turn is braced to a transmission housing 6 likewise forming a supporting structural member or which may form a single piece therewith. Adjacent the transmission housing 6 is a driving axle housing 7 which is firmly braced to the housing 6 and forms a supporting structural member. From the driving axle housing through the intervention of non-illustrated knock-out spindles located on the driving axle tubes there are driven rear driving wheels 9 which are each covered by a fender 10. Starting from the front axle support 1 up to the driving axle housing 7 there are arranged the longitudinal arms or beams 11 of the frame parts 12 which are located at both sides along the crank-case or the oil pan portion of the driving engine 3 and the adjacent supporting structures 5, 6. The longitudinal arms or beams 11 terminate at their ends which is adjacent to the driving axle in slightly inclined legs or posts 13 extending upwardly above the normal height of the head of a driver in the driver's seat. Preferably the fenders 10 are connected to the legs or posts 13. In order to obtain a vibration-free connection of the frame parts 12, the longitudinal arms or beams thereof are by means of elastic intermediate members 14 connected to the front axle support 1 and/or the driving engine 3, and are by means of elastic intermediate members 15 braced to the transmission housing 5, 6, and are by means of elastic intermediate members 16 connected to the driving axle tubes 8 or the driving axle housing 7.

At the level of the steering wheel 17 of the steering mechanism of the tractor, one further leg or post 18 each extends at a slight inclination upwardly from the longitudinal arms 11 preferably along both sides of the hood 4. The legs or posts 18 which may be used for supporting the windshield form with the legs or posts 13 fork-shaped parts whereby lateral openings are formed through which the driver can get into the cab. For purposes of providing a free space for the lateral connection of implements which are not liable to cause the tractor to capsize, the legs or posts 18 are preferably detachably connected to the arms 11. Those ends of legs or posts 13 and 18 which face away from the arms 11 are connected to each other and to the legs (not seen in the drawing) located on the other side of the tractor by means of non-illustrated struts of a weather protective roof 19. The struts of the roof 19 are preferably detachably connected to the legs 13, 18 and are designed to withstand the forces which occur when the tractor capsizes.

Figure 2:
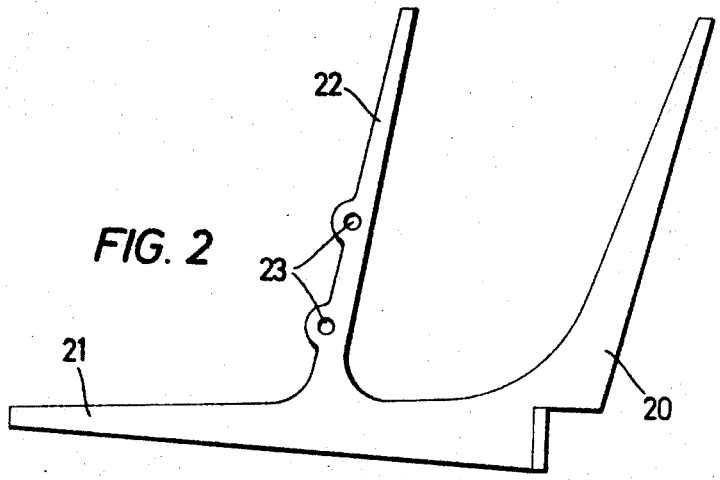
FIG. 2 illustrates frame means which are modified over those of FIG. 1 in that they consist of one piece.

The frame parts 11, 13, 18 may in distinction to the showing of FIG. 1 form a single structural unit 20 as shown in FIG. 2 in which instance the front ends 21 are connected to each other by non-illustrated yokes extending around the front portion of the tractor. As will be seen from FIG. 2, the legs 22 of the frame parts 20 which extend upwardly to the height of the clutch housing are provided with connecting eyes 23 for connection of the loading beams or lifting cylinders of a non-illustrated front loading implement.

Figure 3:
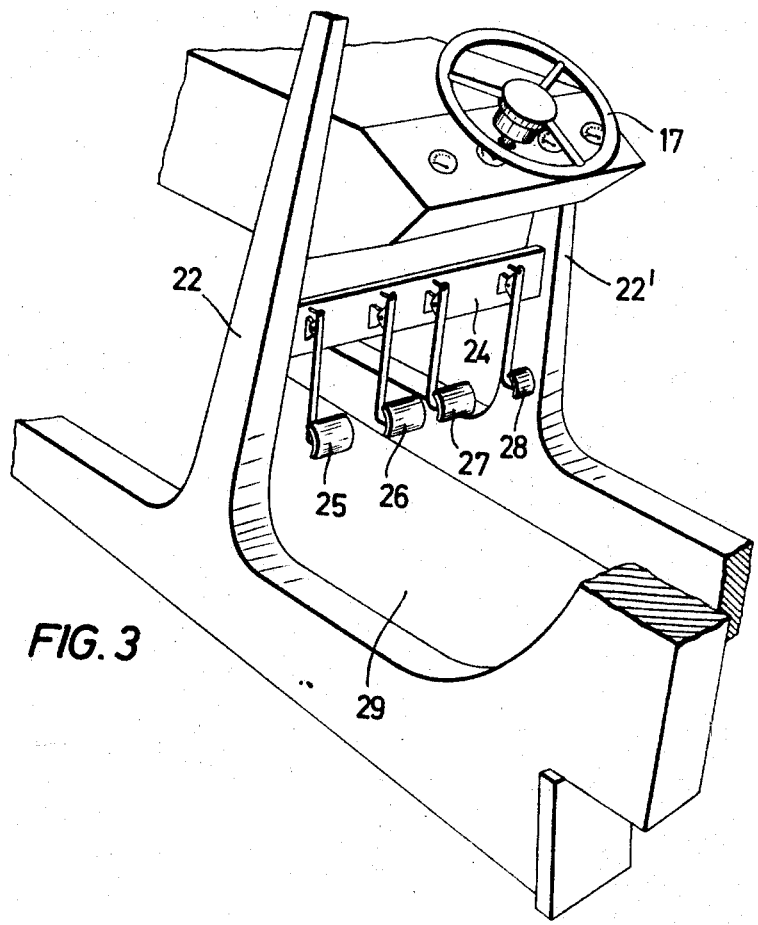
FIG. 3 is a partial isometric view of the tractor of FIG. 1.

According to the showing of FIG. 3, the legs 22, 22' which extend upwardly to the level of the clutch housing 5 and pertain to the frame-shaped parts 20 may for a transverse stiffening of the protective means against capsizing be connected to each other below the steering mechanism, including the steering wheel 17, by means of a transverse yoke 24. Suspended on the transverse yoke 24 are pedals forming clutch and brake pedals 25, 26, 27 and a gas pedal 28. If the steering wheel 17 is connected to a hydraulic transmitter, in other words, has a hydraulic steering system, a non-illustrated further transverse yoke connects at approximately the level of the steering wheel 17 the legs 22, 22' with each other. The hydraulic transmitter and the steering wheel 17 may be mounted on said last mentioned transverse yoke. The transverse yoke which supports the steering means may also act as support for gauges as, for instance, a thermometer, a fuel indicator, an oil indicator, etc. In addition thereto, the longitudinal arms and/or the legs 13, 18, 22 are directly above the transmission or axle housing connected to each other by a platform 29 in order further to reinforce the frame parts 12. The frame parts 12 will thus in view of the elastic connection of the frame parts 12 with the supporting structural groups 1, 3, 5, 6, 7, 8 together with the driver's seat 30 be mounted in a vibration-free manner. It may be mentioned that when mounting the steering wheel together with the hydraulic transmitter on a transverse yoke which interconnects the legs 22, 22', likewise a vibration-free steering mechanism will be assured.

Figure 4:
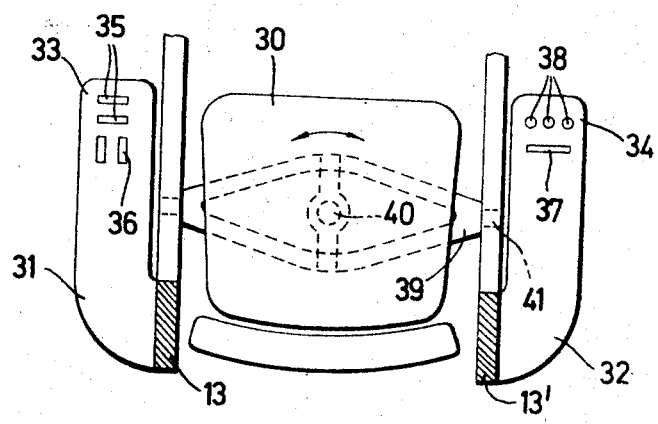
FIG. 4 is a top view of the driver's seat of the tractor.
Figure 5:
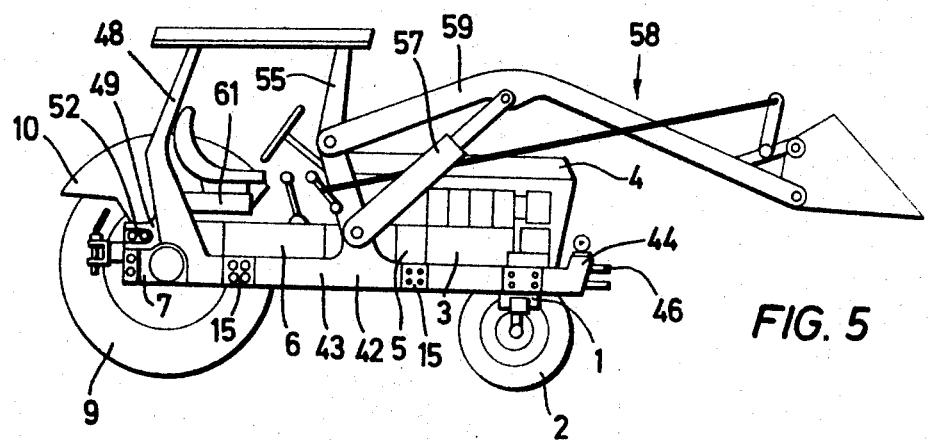
FIG. 5 represents a side view of the tractor according to the invention with built-on loading device.
Figure 6:
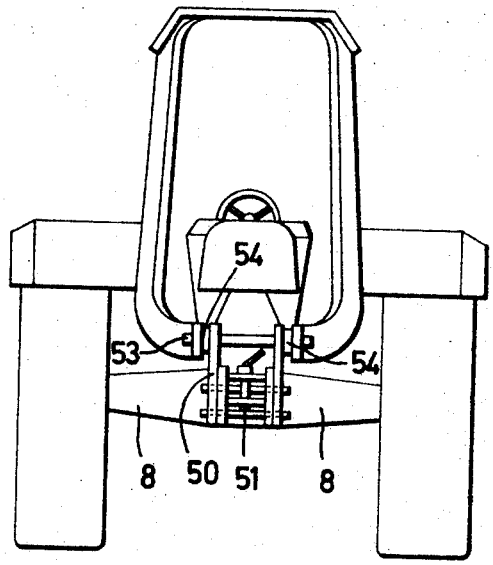
FIG. 6 shows the tractor of FIG. 5 as seen from the rear but with the loading device removed.
Figure 7:
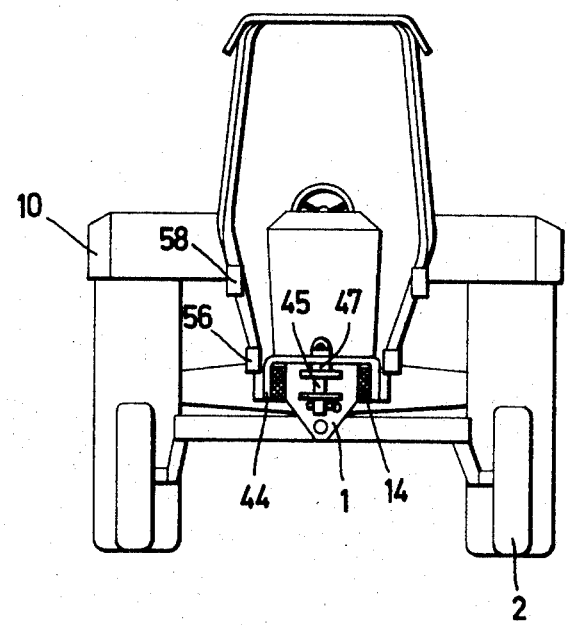
FIG. 7 shows a front view of the tractor according to FIGS. 5 and 6 with the loading device removed.

As will be seen from FIG. 4, according to the invention, it is also possible to provide the legs 13, 13' arranged on both sides of the driver's seat 30 between the driving wheels 9 and extending along said driver's seat in upward direction, with arm rests 31, 32. The front portions 33, 34 of the arm rests are provided with actuating means for various devices. Preferably, the actuating device for the gear shift may be in the form of keys 35 and the actuating means for a reversing device for the drive may be designed as keys 36 and located in the front portion 33 of the arm rest 31. On the other hand, the front portion 34 of the arm rest 32 may preferably be provided with keys 37 for actuating a differential locking system of the transmission whereas the keys 38 may be provided for actuating a hydraulic system. It may be mentioned that instead of the keys 35–38 mounted in the arm rest also actuating levers may be provided in the arm rest or may be extended upwardly through the arm rests 31, 32. By means of said actuating levers, the auxiliary control means arranged on the legs 13, 13' or below the arm rest may be actuated.

For purposes of transversely reinforcing the legs 13, 13', the legs are below the driver's seat 30 bridged by a transverse yoke 39 which preferably has a vertical pivot axis 40 and a pivot axis 41 extending transverse to the driving direction for the driver's seat.

The tractor illustrated in FIGS. 5 – 11 is provided with frame parts 42 which bridge the supporting groups 1, 3 and 5 – 8. These frame parts 42 principally correspond as to structure and function to the frame parts 12 of FIGS. 1 – 4. The longitudinal arms 43 of the frame parts 42 are likewise through elastic intermediate members in the form of block-shaped rubber elements 14, 15 connected to the front axle support 1, the transmission housing 6, 7 and/or the driving axle housing 8. The longitudinal arms 43 furthermore have those ends thereof which are adjacent to the front connected to each other through a yoke 44 which is shown in greater detail in FIG. 7 and is extended around the front portion of the tractor. The yoke 44 is adapted selectively by means of a bolt 45 to be locked to the catching means 46 of a front pushing device or to the holding means (not shown) therefor. For vertically fixing the yoke 44 and thereby the frame parts 42 relative to the front axle support 1, a ring 47 is interposed between the yoke 44 and the upper part of the catching means 46. The bolt or pin 45 is shown on that side which faces away from the upper collar. In conformity with FIG. 6, the frame parts 42 have their rear ends extended by plate-shaped parts 49 which are preferably arranged on the legs 48 and which extend to the level of perforated strips 50 which serve for receiving a rear trailer clutch 51.

The plate-shaped members 49 are at the level of two oppositely located bores of the perforated strip 50 provided with a longitudinal passage 52. Furthermore, by means of a bolt 53 shown in FIG. 6 and adapted to be passed through the perforated strip 50 and visible on both sides the plate-shaped members 49 are adapted to be arrested in their vertical direction of movement and also in their direction of movement transverse to the central longitudinal axis of the tractor. For fixedly locating the plate-shaped members 49 in transverse direction, spacer rings 54 are placed between the members 49 and the perforated strips 50.

As will also be seen from FIGS. 5 – 10, the legs 55 of the frame members 42 which legs are within the range of the clutch housing 6 extended upwardly are provided with connecting eyes 56 for the connection of the lifting cylinders 57 and are furthermore provided with connecting eyes 58 for the connection of the lifting beams of a front loading device 60 which, as shown in FIGS. 6, 7, and 9, 10, is detached when used in agriculture. For the front loading operation shown in FIG. 5, the frame parts 42 are on all sides rigidly locked relative to the supporting structural groups 1, 3 and 5 – 8, whereas when working the ground, the frame parts 42 are after removal of the bolts 45 and 53 movable in all directions relative to the structural groups supporting the same.

It may be mentioned that there also exists the possibility of effecting the locking of the frame parts relative to the structural groups 1, 3 and 5 – 8 carrying the same by means of bolts which extend laterally through the longitudinal arms 43. The plug connections between the structural groups and the frame parts 42 may be so designed that selectively the frame parts are locked only in vertical direction of movement and/or in the longitudinal direction of movement of the frame parts or only in transverse direction thereof.

Figure 8:
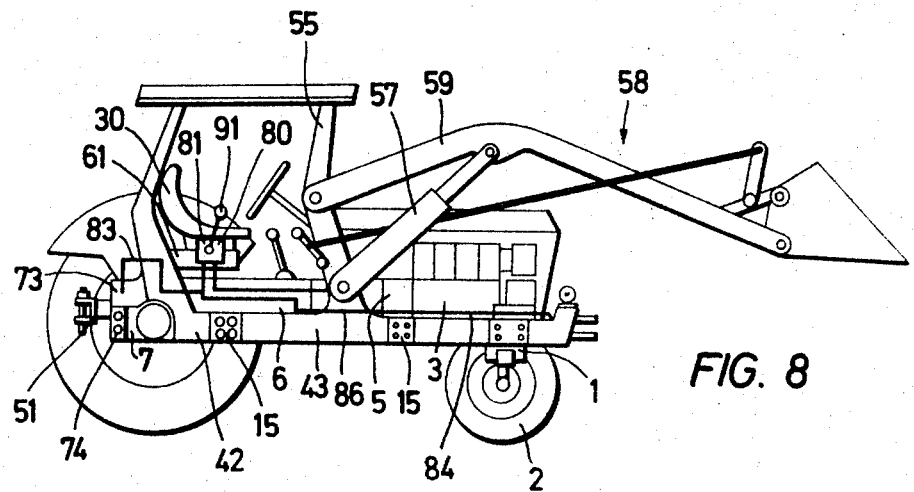
FIG. 8 is a side view of a tractor according to the invention with built-on loading device and with hydraulic locking means for the frame parts.
Figure 9:
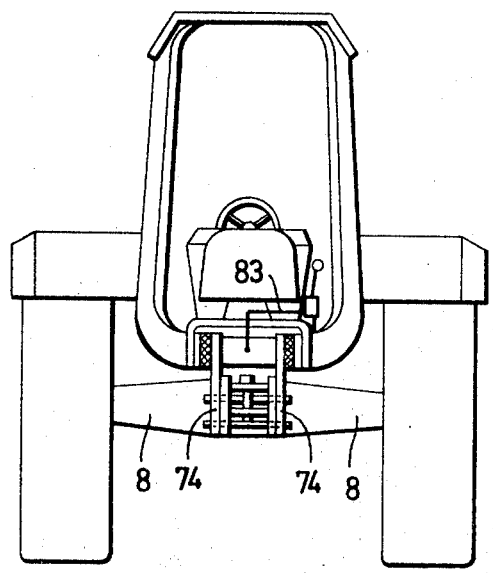
FIG. 9 shows the tractor of FIG. 8 from the rear with the loading device removed.
Figure 10:
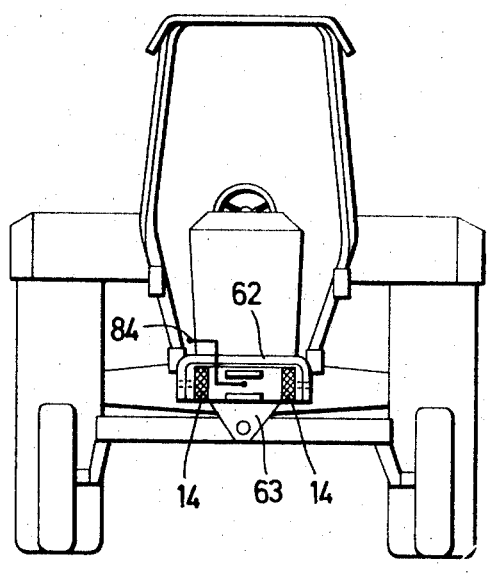
FIG. 10 is a front view of the tractor of FIGS. 8 and 9 with the loading device removed.

With the tractor illustrated in FIGS. 8 – 10, the longitudinal beams 43 are below the driver's seat 30 interconnected through a protruding U-shaped transverse yoke 61 and at their front ends are interconnected by a yoke 62 which extends around a protruding part 63 of the front axle support. On the protruding part 63 between the two legs 64 of yoke 62 there is provided a hydraulically operable lock which is in the form of a spreading cylinder 65. The spreading cylinder 65 is formed by a cylinder 66 and by two pistons 67 which are guided in said cylinder and on one side are adapted to be subjected to pressure fluid. The pistons 67 confine a working chamber 71. The pistons 67 are connected to piston rods 68 which are adapted to move outwardly as locking bolts 69. The locking bolts 69 are in alignment with bores 70 provided in the longitudinal arms 48 and corresponding in diameter to the diameter of said bolts. The bolts 69 are also in alignment with legs 64. Furthermore, the locking bolts 69 have their end faces provided with an incline which makes it possible that the locking bolts 69 are automatically introduced into the bores 70 if, due to an uneven terrain, the axles of the bores 70 and of the locking bolts 79 are not in alignment with each other. An unlocking of the locking bolts 69 is effected when the working chamber 71 of the spreading cylinder 65 is pressure-less by means of springs 72 which urge the piston 67 of cylinder 65 to move in unlocking direction.

At the rear end, with the embodiment of FIGS. 8 – 11, the frame parts extend by means of plate-shaped parts 73, preferably arranged on the legs 48, into the region of perforated strips 74 flanged to the driving axle housing 7. The frame parts 42 are interconnected by a yoke 75 with legs 64. In addition to connecting a trailer clutch 51, the perforated strips 74 also serve for receiving a further spreading cylinder 76 which is provided for locking that portion of the frame parts 42 relative to the housing 7 which is located at the rear side. The spreading cylinder 76 is of substantially the same design as the spreading cylinder 65.

The supply of the lifting cylinders 57 and the spreading cylinder 65, 76 with pressure fluid is effected by a pressure medium pump 77. Pump 77 draws the pressure fluid from a pressureless reservoir 78 and conveys the pressure fluid through a conduit 79 to a four-way valve 80 which is used in connection with the control of the spreading cylinders 65, 76. The valve spool (not illustrated) of the four-way valve 80 is positively coupled to the valve spool of another four-way valve 81 which is adapted to control the pressure fluid supply and pressure fluid discharge of the two lifting cylinders 57 of the loading device 60. By means of the four-way valve 80, the pressure fluid is conveyed from the discharge outlet to a distributor 82 which latter through a conduit 83, 84, 85 communicates with the spreading cylinders 65, 76 or the supply to the four-way valve 81. The four-way valve 81 is at its discharge side connected through a conduit 86 with the working chambers 87 of the two lifting cylinders 57 and through a conduit 88 with a conduit 89. The conduit 89 establishes communication between the discharge side of the four-way valve 80 and the pressure fluid reservoir 78. Interposed between the conduit 79 and the conduit 89 is a relief valve 90 through which the excessive pressure fluid can pressure-less escape into the reservoir 78. The symbolically illustrated and interengaged four-way valves 80 and 81 are, in conformity with FIG. 8, preferably arranged on the transverse yoke 61 adjacent the driver's seat 30 so that the operator can easily handle the actuating member, preferably in the form of a manually operable lever 91, for the valves 80 and 81. Lever 91 is guided in a segment 92 indicated in FIG. 11. Furthermore, the manually operable lever 91 is adapted by means of an arresting device (not illustrated) provided in the segment 92 to be arrested in an illustrated O-position and also in a lowering position S, a neutral or holding position N and a lifting position H. In the illustrated O-position, the four-way valves 80 and 81 establish communication between the working chambers 71 of the cylinders 65 and 76 and the working chambers 87 of the lifting cylinders 54 with the pressureless reservoir 78. When the manually operable lever 91 is moved into the position S, the valve spool of the four-way valve 80 will block the discharge of the valve 80 with regard to the pressureless reservoir 78, and the working chambers 71 of the cylinders 65 and 76 are provided with pressure fluid. As a result thereof, the latching bolts 69 are introduced into the bores 70, and the frame parts 42 are locked with regard to the supporting structural groups 1, 3 and 5 – 8. In the position S of the four-way valve 81, the pressure-less connection between the reservoir 78 and the working chambers 87 of the lifting cylinders 57 is maintained. A pivoting of the manually operable lever 91 into the position N brings about that in view of the four-way valve 80, the working chambers 71 of the spreading cylinders 65, 76 are actuated by pressure fluid to move in locking direction. However, the four-way valve 81 will, when occupying the position N, separate the working chambers 87 of cylinders 57 from the pressure-less pressure fluid reservoir 78. When the manually operable lever 91 is tilted into the position H, a connection, similar to the situation prevailing when the valve 80 occupies the position N and S, is maintained between the pressure fluid pump 77 and the working chambers 71 of the spreading cylinders 65 and 76. However, in this instance, through the branch line 82 and the four-way valve 81 in its position H, pressure fluid passes to the working chambers 87 of the lifting cylinders 57 whereby the lifting cylinder mechanism will lift the attached loading device 60 while the frame parts 42 are locked with respect to the supporting structural groups.

It is, of course, to be understood that the present invention is, by no means, limited to the particular showing in the drawings but also comprises any modifications within the scope of the appended claims.

What is claimed is:

1. A self-supporting tractor type vehicle comprising in combination: front and rear ground wheels, front and rear axles for the wheels, an engine, a transmission drivingly connecting said engine to at least some of the wheels and having a housing, said engine and axles and wheels and transmission housing being connected together to form a self-supporting bridging structure, a driver's compartment in said structure, and protection means for protection of a driver in said compartment in the event of the vehicle capsizing, said protection means comprising additional longitudinal beams extending along the opposite sides of said structure and connected to the front and rear axles, and a pair of spaced upright posts adjacent said compartment on each side and fixed to the side beams and extending upwardly beyond the normal height of a driver in said compartment.

2. A tractor type vehicle in combination according to claim 1, which includes means interconnecting the upper ends of said upwardly extending posts together.

3. A tractor type vehicle in combination according to claim 2, in which said upwardly extending posts are integral with said frame parts and connecting means interconnecting each post above the height of the driver with the corresponding post on the opposite side of the vehicle.

4. A tractor type vehicle in combination according to claim 3, in which said connecting means for said post comprises detachable struts of a protective roof provided over the driver's compartment.

5. A tractor type vehicle in combination according to claim 2, in which the upwardly extending rearward posts are integral with said frame parts and said upwardly extending forward posts are detachably connected to said frame parts.

6. A tractor type vehicle in combination according to claim 2, which includes a windshield at the front of said compartment, said windshield extending laterally between and supported directly by said upwardly extending forward posts.

7. A tractor type vehicle in combination according to claim 2, in which said rearward posts each extend upwardly near a vertical transverse plane containing the axis of said rear axle.

8. A tractor type vehicle in combination according to claim 7, includes bridging means connecting said frame parts together in the region of said front axle.

9. A tractor type vehicle in combination according to claim 1, which includes resilient intermediate means interposed between said frame parts and said front and rear axles.

10. A tractor type vehicle in combination according to claim 1, in which said engine is located behind the front axle and connected thereto and said transmission housing is located between said engine and said rear axle and is connected to both thereof, and elastic intermediate members interposed between said frame parts on the one hand and said front axle and engine and transmission housing and rear axle on the other hand.

* * * * *